United States Patent
Herluison et al.

(10) Patent No.: US 6,236,679 B1
(45) Date of Patent: May 22, 2001

(54) METHOD AND DEVICE FOR ESTIMATION OF MOTIONS OF IMAGE PORTIONS FOR MOVING IMAGE COMPRESSION CIRCUITS

(75) Inventors: Jean-Claude Herluison, Lumbin; José Sanches, Meylan, both of (FR); Alessandro Uguzzoni, Bologna (IT)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/989,116

(22) Filed: Dec. 11, 1997

(30) Foreign Application Priority Data

Dec. 13, 1996 (FR) ................................................ 96 15605

(51) Int. Cl.$^7$ ........................................................ H04N 7/00
(52) U.S. Cl. ............................................................ 375/240
(58) Field of Search ..................................... 348/699, 416, 348/700; 375/240.17

(56) References Cited

U.S. PATENT DOCUMENTS

| | | | |
|---|---|---|---|
| 5,142,361 | | 8/1992 | Tayama et al. ........................ 358/105 |
| 5,442,409 | * | 8/1995 | Morgan ................................. 348/700 |
| 5,589,884 | * | 12/1996 | Ohguchi ............................... 348/405 |
| 5,649,030 | * | 7/1997 | Normile et al. ...................... 382/253 |
| 5,721,595 | * | 2/1998 | Chen et al. ........................... 348/699 |
| 5,731,850 | * | 3/1998 | Maturi et al. ......................... 348/699 |
| 5,751,378 | * | 5/1998 | Chen et al. ........................... 348/700 |

OTHER PUBLICATIONS

IBM Technical Disclosure Bulletin, vol. 34. No. 7B, Dec. 1, 1991, pp 217–219, "Activity Detection".

Proceedings of the International Symposium on Circuits and Systems, New Orleans, May 1–3, 1990. vol. 2 of 4, May 1, 1990, Institute of Electrical and Electronics Engineers, pp 1003–1006, Sun H, et al., "Motion–Compensated Vector Quantization With A Dynamic Codebook".

International Symposium on Circuits and Systems (ISCAS) Communication and Visual Signal Processing (CVSP), ondon, May 30–Jun. 2, 1994, vol. 3 of 6, May 30, 1994, Institute Of Electrical and Electronics Engineers, pp 221–224. Hyung Chul Kim et al., "A Pipelined Systolic Arrays Architecture For The Hierachical Block–Matching Algorithm".

\* cited by examiner

*Primary Examiner*—Chris Kelley
(74) *Attorney, Agent, or Firm*—Wolf, Greenfield & Sacks, P.C.; James H. Morris; Theodore E. Galanthay

(57) ABSTRACT

The present invention relates to a method and device for estimation of the motion of a macroblock of pixels of a current image with respect to a reference window taken in a preceding image, including, in a first step, determining the cumulated distortion of the pixels of the current macroblock for a null motion vector in the reference window; choosing, as the motion vector of the current macroblock, the null vector if the distortion is lower than or equal to a first threshold; and otherwise choosing, in a second step, a vector for which the current macroblock exhibits a minimum distortion with respect to a macroblock of the reference window.

19 Claims, 5 Drawing Sheets

METHOD AND DEVICE FOR ESTIMATION OF MOTIONS OF IMAGE PORTIONS FOR MOVING IMAGE COMPRESSION CIRCUITS

BACKGROUND OF THE INVENTION

1. Field of the Invention

The present invention relates to a circuit for compression of moving images, such as television images. It more specifically relates to the estimation of motions of portions of images, a portion of a current image being compared with its environment in the preceding image.

2. Discussion of the Related Art

A circuit of this type is used for coding the images so that they can be transmitted, in the context of a video image transmission, while minimizing the amount of information to be transmitted. The compression performed by the circuit consists, among others, in performing an estimation of the motion between portions of two successive images. This motion estimation enables to code, and thus to transmit, for portions of a current image, only motion vectors and distortion information associated with these portions.

The images, for example, coming from a video camera, are cut into image portions, called "macroblocks". These macroblocks generally correspond to a cutting up of the image into squares, each square having a dimension of 16×16 pixels. An image is stored sequentially, line by line, in a video memory, and the pixels so stored are extracted from this video memory by sets of pixels corresponding to square portions of the image. These sets of pixels, or macroblocks, are stored in a cache memory, to be used by a computer for, among others, determining the motion vector of the considered macroblock.

To perform the motion estimation of a macroblock, the computer is provided not only with the pixels of the considered macroblock of the current image, but also with pixels surrounding the corresponding macroblock in the preceding image. The computer sequentially processes each macroblock of the current image, by using, at least partially, the pixels of neighboring macroblocks in the preceding image which constitute a set of reference values, called the "reference window". In practice, a first cache memory contains the current macroblock and a second cache memory contains a larger reference window. This reference window includes, in addition to the pixels of the considered macroblock in the preceding image, at least part of the pixels of the macroblocks of the preceding image which are sequentially neighbor thereto in all directions.

FIG. 1 schematically shows an example of motion estimation device to which the present invention applies.

This device communicates by means of buses 1, 2, with a processor that controls the moving image compression circuit and with a processor that controls access to a video memory containing the data to be processed. The motion estimator includes a first finished state machine 3 (TOP CONTROL) managing the operation of the motion estimator and, in particular, the writing of the data into cache memories 4 (CW_RAM) and 5 (SW_RAM) for containing, respectively, the current macroblock to be processed and the reference window associated therewith. State machine 3 includes a link 6 to bus 1 and transfers the data, that it receives via a link 7 to bus 2, to controllers 8, 9 (CTRL) of memories 4, 5, via links 10, 11, on which the data, the write addresses and the control signals altogether transit. An example of addressing of a cache memory of a moving image compression circuit is described in patent application Ser. No. 94/05339, the content of which is incorporated herein by reference.

The estimation of the motion of a macroblock consists of determining the motion vector of this macroblock with respect to a macroblock of the preceding image and the distortion between the two macroblocks, that is, the cumulated difference between the pixels of the two macroblocks. The motion vector is determined by searching, in the reference window, the macroblock which exhibits a minimum distortion.

The vector of motion of a current macroblock with respect to the position of this macroblock in the preceding image is determined by examining the cumulated distortion of all the pixels in this current macroblock with respect to the pixels of macroblocks extracted from the reference window in all the positions likely to be taken by the current macroblock in this reference window. For this purpose, the motion estimator includes a unit 12 (DIST_OPE) of operators organized in systolic architecture which calculate, in parallel for a given motion in one direction, the distortion of the current macroblock with respect to all motions in the other direction. Unit 12 includes two data inputs 13 and 14 connected to the data outputs of memories 4, 5, for receiving, for each calculation cycle, a new pixel from each of the memories. Unit 12 includes as many outputs 15 as it includes operators. These outputs are connected to a unit 16 (MIN_OPE) of determination of the minimum distortion to determine the motion vector of the current macroblock. An output 17 of unit 16 issues this motion vector and the corresponding distortion to a set of registers 18 (REG), communicating over a link 19 with state machine 3. The set of registers 18 is meant to store the operation parameters supplied by the control processor of the moving image compression circuit and the results of the operations performed. Units 12 and 16 communicate, via links 20 and 21, with a second finished state machine 22 (OPE_CONTROL) for, in particular, organizing the reading of the data from memories 4 and 5. Read control signals of memories 4 and 5 and information relative to the state of progress of the operational process are issued by outputs 23, 24 of state machine 22 to transcoders 25, 26 (TRC) respectively associated with memories 4, 5. Transcoders 25, 26 determine, based on state signals issued by machine 22 and coming from counters (not shown), the read addresses of memories 4, 5.

The motion estimator shown in FIG. 1 is likely to perform a hierarchic motion estimation, that is, an estimation including several phases of different level for each macroblock. A first phase corresponds, for example, to searching the minimum distortion based on a macroblock and a reference window decimated by a factor two and then determining a motion vector to within two pixels. A second phase consists of determining the motion vector to within half a pixel based on a macroblock and a reference window reconstituted by linear interpolation. The use of a hierarchic (or telescopic) process of motion estimation is well known in the art. For clarity, it will be spoken of a macroblock, be it a portion of a basic, decimated, or interpolation-obtained image. It should only be noted that the data present in memories 4 and 5 must be coherent with one another.

The different phases are performed by means of the same motion estimator, and state machine 3 communicates parameters characteristic of each phase to the different components of the estimator. For this purpose, state machine 3 uses links 27, 28, 29, with state machine 22, transcoder 25 and transcoder 26 as well as links 19, 20, and 21 previously described. It should be noted that all components of the motion estimator, including the state machine, the operator units and the transcoders are wired, that is, are implemented in hardware form, as opposed to a software form.

The use of a hierarchic search process is linked, in particular, with the size of the reference window and with the image transmission rate. Indeed, the larger the reference window, the more necessary it is to perform a great number of operations for a given image transmission rate. For example, in an H263 standard applied to videophony, the macroblocks contain 16×16 pixels and the search is to be performed with a motion of plus or minus 16 pixels in all directions. Further, this standard provides an accuracy which can be as much as to within half a pixel by linear interpolation. The application of a search in the entire reference window in a single phase as has been previously done for the application to an H261 standard is not applicable since it would lead to using too large a number of operators. Standard H261 applies to the processing of images in the so-called "QCIF" format transmitted at a rate of 15 images per second, where each image is formed of 99 macroblocks of 16×16 pixels. Standard H263 provides the processing of images in the so-called "CIF" format at a rate of 30 images per second, where each image includes 396 macroblocks of 16×16 pixels. The application of the methods used for standard H261 would lead to providing around 480 parallel operators.

Further, if the application of a hierarchic search process enables respecting the time constraints for the determination of the motion vectors of the entire macroblocks, standard H263 also provides an operating mode in which the accuracy is increased by determining the motion of four separate blocks in each macroblock. It is then no longer possible to maintain the time constraints of the images at the CIF format with a unit 12 including 16 parallel operators.

SUMMARY OF THE INVENTION

The present invention aims at providing a method and a device for motion estimation which reduces the time required for the estimation of the motion of at least some macroblocks of the images.

The present invention also aims at providing a method and a device of motion estimation which are compatible with both a hierarchic search and a single-phase search.

To achieve these objects, the present invention provides a method of estimation of the motion of a macroblock of pixels of a current image with respect to a reference window taken in a preceding image, including, in a first step, determining the cumulated distortion of the pixels of the current macroblock for a null motion vector in the reference window; choosing, as the motion vector of the current macroblock, the null vector if the distortion is lower than or equal to a first threshold; and otherwise choosing, in a second step, a vector for which the current macroblock exhibits a minimum distortion with respect to a macroblock of the reference window.

According to an embodiment of the present invention, this method includes, during the second step, comparing the distortion calculated for each motion vector with a minimum distortion previously calculated for a previously examined vector, the minimum distortion being initialized by the distortion calculated during the first step; and replacing the minimum distortion with the current distortion if the latter is lower.

According to an embodiment of the present invention, this method includes, during the second step, comparing, for each modification of the minimum distortion, the value of this minimum distortion with a second predetermined threshold value; and choosing, as the motion vector of the current macroblock, the vector associated with this minimum distortion.

According to an embodiment of the present invention, the method includes, during the second step, using operators organized in systolic architecture to calculate, for each position of the current macroblock in a first direction of the reference window, the distortion between the current macroblock and several macroblocks in a second direction of the reference window; and interrupting the calculations of distortion performed for this position in the first direction if, during the calculations, the distortions become, for all positions in the second direction, higher than the minimum distortion.

According to an embodiment of the present invention, the method includes a step intermediary between the first and second steps including calculating the distortion between the current macroblock and the mean value of the pixels of this macroblock; and interrupting the motion estimation of the current macroblock if the distortion with respect to the mean value of the pixels is lower than or equal to a third predetermined threshold.

The present invention also provides a device for estimation of the motion of a macroblock of a current image in a reference window containing the current macroblock and its environment in a preceding image, including: a first cache memory for containing the current macroblock; a second cache memory for containing the reference window; and a unit of operators, organized in systolic architecture and supplied by a reading from the cache memories, for calculating, for each position of the current macroblock in a first direction of the reference window, the distortion between the current macroblock and several macroblocks of the reference window in a second direction of the reference window; and means implementing the above motion estimation method.

The foregoing objects, features and advantages of the present invention will be discussed in detail in the following non-limiting description of specific embodiments made in connection with the accompanying drawings.

DETAILED DESCRIPTION

Figure 1:
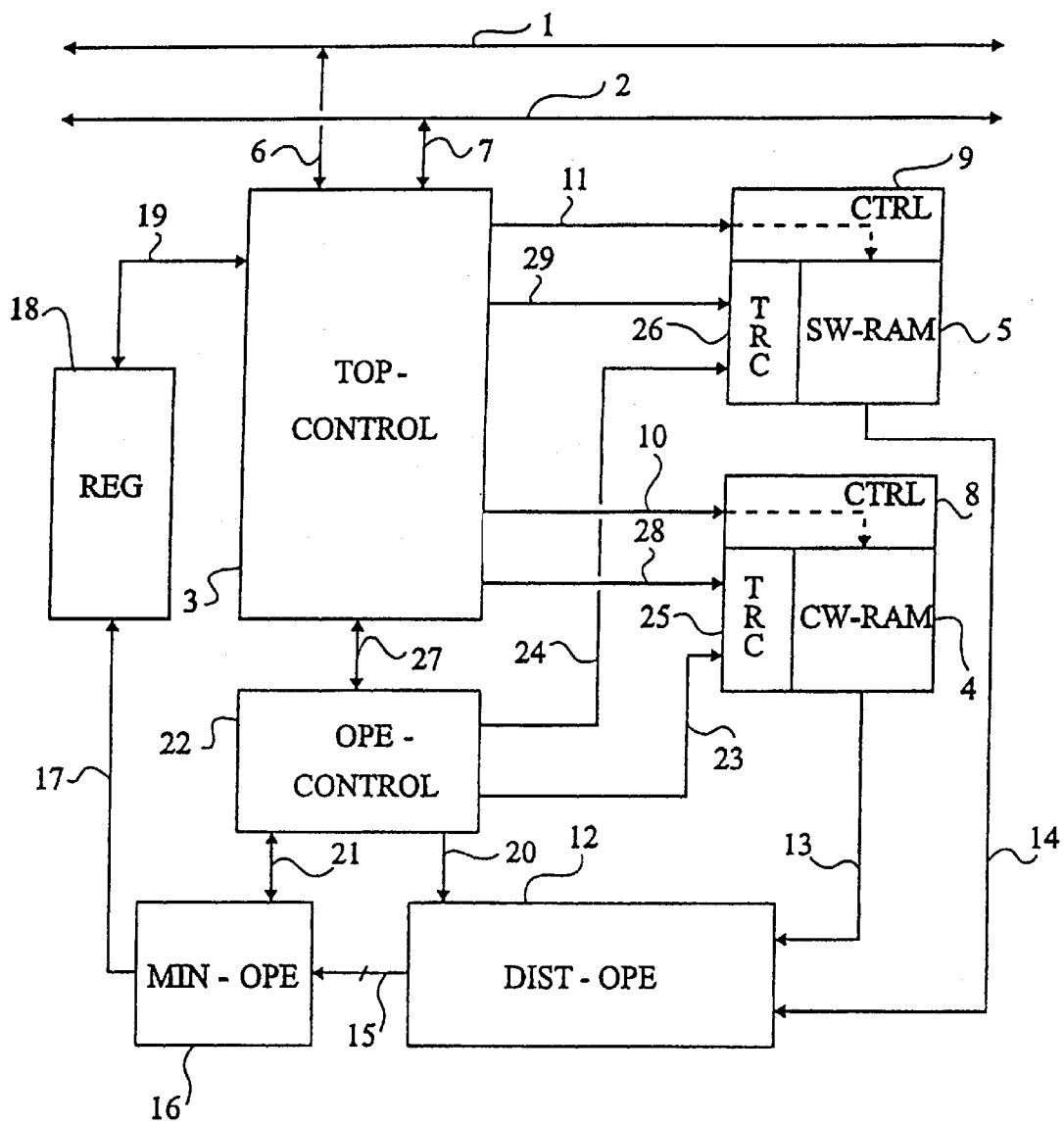
FIG. 1, previously described, is meant to show the state of the art and the problem to solve.

For clarity, only those elements of the device and those steps of the method which are necessary to the understanding of the present invention have been shown in the drawings.

A characteristic of the present invention is to start the motion estimation for each macroblock with a calculation of the distortion of this macroblock with respect to the same macroblock in the preceding image, that is, with a null motion, and to proceed to the processing of the next macroblock if the distortion is lower than a predetermined threshold. This threshold corresponds to a sufficiently low distortion value for which it is assumed that the macroblock is identical to the macroblock of same position of the preceding image, that is, this portion of the image has remained substantially unaltered. Thus, a scanning of the reference window associated with each macroblock is performed to determine the minimum distortion, only if necessary. Thus, for the image portions which remain unaltered, a considerable number of calculation cycles is saved.

Another characteristic of the present invention is that, during the determination of the minimum distortion of the current macroblock based on a parallel calculation of this distortion in a given direction (for example, the vertical direction) of the reference window for each position in the other direction (for example, the horizontal direction), the distortion calculations are interrupted to proceed to the following horizontal position if, during the calculation, the distortions become, for all the vertical positions, higher than the minimum distortion already found.

Figure 2:
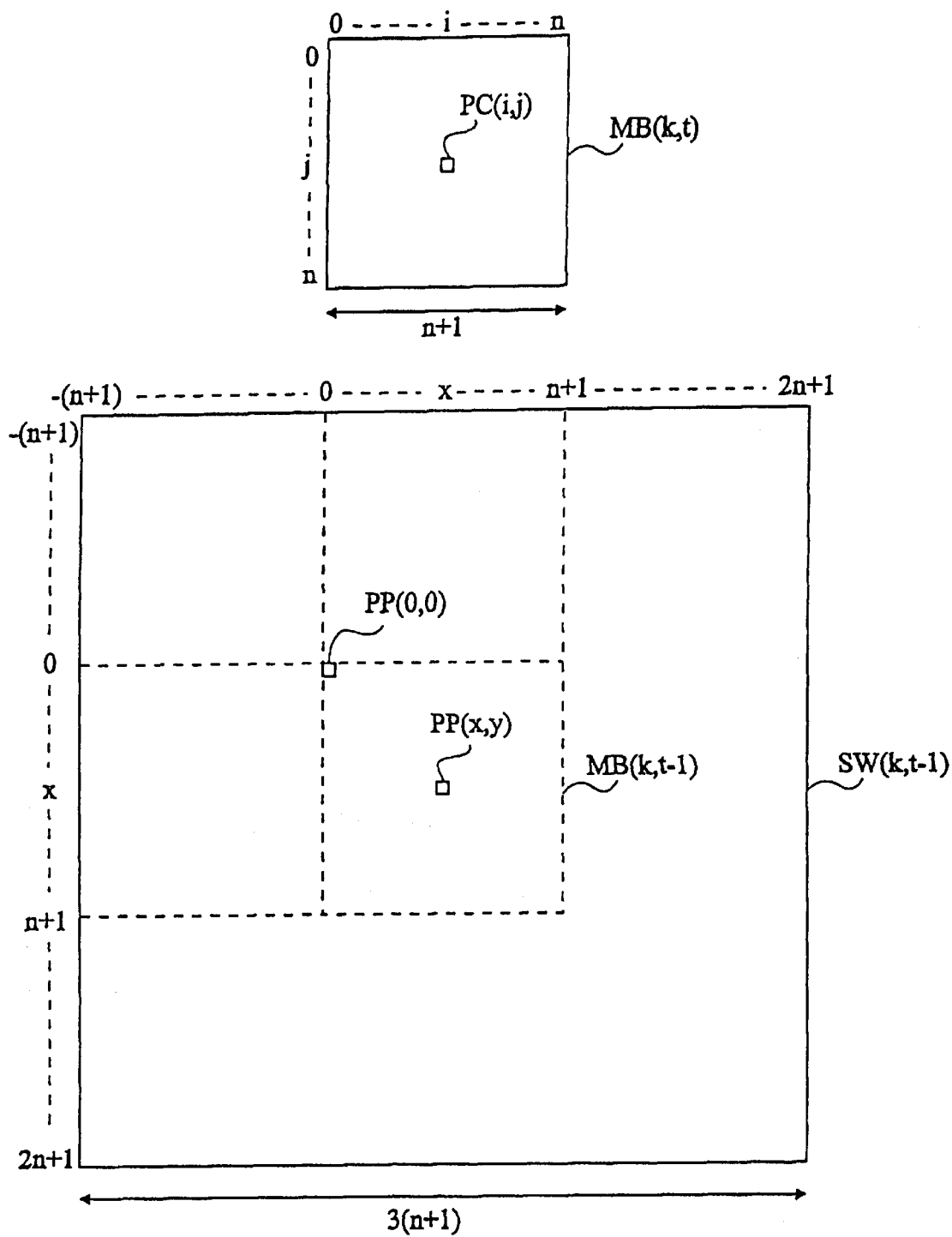
FIG. 2 schematically shows a macroblock to be processed and a reference window of its environment in the preceding image.

FIG. 2 shows an example of macroblock to be processed and the reference window associated therewith, that is, the respective contents of cache memories 4 and 5 for the processing of a given macroblock.

In this example, a macroblock MB(k, t) to be processed of the current image is a square array of (n+1).(n+1) pixels. The reference window SW(k, t−1) associated therewith in the preceding image further includes macroblock MB(k, t−1), the eight macroblocks which surround the latter in the preceding image in all directions.

In the following, "macroblock" will be used to designate the set of values submitted to the motion estimation method according to the present invention, be it a macroblock decimated by a factor two or a macroblock reconstituted by linear interpolation to within one half pixel. Thus, for image macroblocks of 16×16 pixels to be analyzed in a reference window of 48×48 pixels, macroblock MB(k, t) shown in FIG. 2 includes 8×8 pixels after decimating the original macroblock for a motion estimation to within two pixels, reference window SW(k, t−1) including 24×24 pixels. For the motion estimation to within one half pixel, the macroblock and the reference window respectively correspond to sets of 16×16 pixels and 8×8 pixels, this calculation phase to within one half pixel corresponding to improving the determination to within two pixels.

An embodiment of the method according to the present invention for squares macroblocks and reference windows, respectively of (n+1).(n+1) and 3(n+1).3(n+1) pixels by means of 2(n+1) operators in systolic architecture, will be discussed hereafter. The transposition of the described operation to arrays of different dimensions is performed by adapting the addressing of the cache memories in the read mode and/or the number of operators used in the series of operators of the motion estimator.

Figure 3:
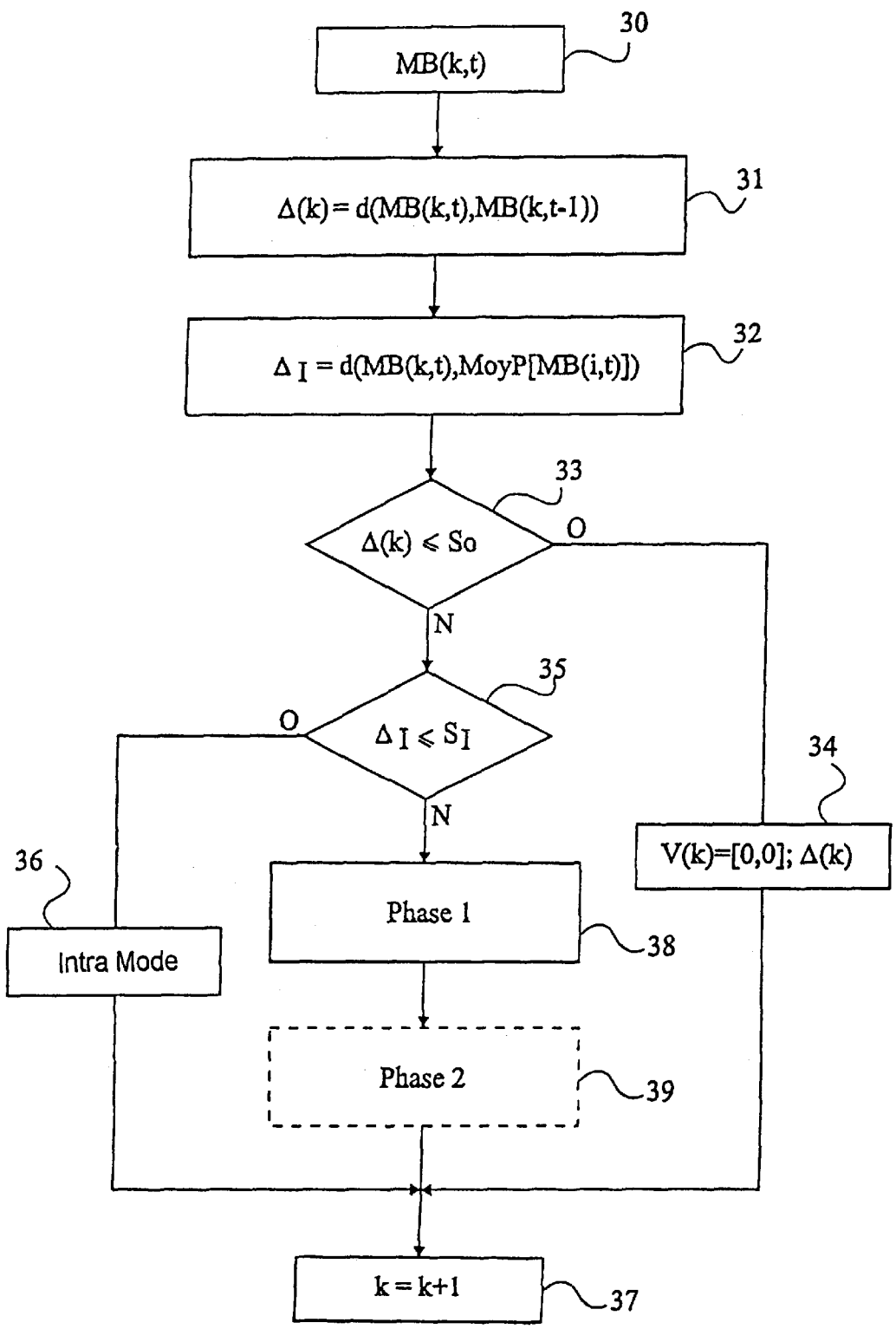
FIG. 3 shows, in the form of a simplified flowchart, an embodiment of the method according to the present invention for estimating the motion of a given macroblock.

FIG. 3 very schematically shows an embodiment of the method according to the present invention. The example shown corresponds to the motion estimation for a macroblock MB(k, t) of rank k (block 30) in the current image.

First (block 31), distortion Δ(k) between macroblock MB(k, t) and this same macroblock MB(k, t−1) in the reference window, that is, the distortion for a null motion, is determined. The determination of the distortion for a null motion can be performed on a decimated or undecimated macroblock.

Then (block 32), a determination of the distortion $\Delta_I$ between macroblock MB(k, t) and the mean value of the pixels of the macroblock is performed. The mean value of all pixels of the macroblock is thus first calculated. Then, the distortion calculation performed by operator unit 12 (FIG. 1) is applied by using a single operator successively receiving all the pixels in memory 4 and, for each calculation, the same value on its input 14.

If desired, distortions Δ(k) and $\Delta_I$ can be performed simultaneously if the systolic architecture organization of the operators of unit 12 can be parametered to make two of these operators individually usable.

Then (block 33), distortion Δ(k) is compared with a predetermined threshold S0. Threshold S0 is chosen to correspond to a distortion value acceptable for substantially fixed images. If Δ(k)⇔S0, the result of the motion estimation stored in registers 18 corresponds to a null vector V(k) and to distortion Δ(k) (block 34). Otherwise (block 35), distortion $\Delta_I$ is compared with a predetermined threshold $S_I$. This comparison 35 is directed, according to a characteristic of the present invention, to selecting a macroblock of very low contrast (very uniform). If $\Delta_I$⇔$S_I$, this then means that the variable-length coding performed on the macroblock for its transmission will lead to a specifically short data message since, after coding a first pixel of this macroblock, the other pixels of the macroblock can be coded with a very low number of bits due to the inverse cosine transform coding method used for this kind of transmission.

This characteristic of the present invention reduces the duration of the image transmission. Indeed, the standards provide that each macroblock is to be transmitted integrally (in so-called "Intra" mode) at maximum intervals (for example, every 100 images) to regenerate the motion estimation in order to reduce the effect of error accumulations linked with image compression. An advantage of the present invention is that instead of transmitting at fixed intervals a macroblock in Intra mode, at the risk of having to transmit it when it is of particularly high contrast, a transmission in Intra mode is selected (block 36) when the block has little contrast. Whether at the end of step 34 or 36, the following macroblock of the current image is then processed (block 37).

If the result of the comparison performed in step 35 is negative, a scanning of the reference window is then performed to determine the motion vector associated with a minimum distortion of the current macroblock.

As indicated previously, this motion estimation by scanning can be performed in several phases (blocks 38 and 39).

Figure 4:
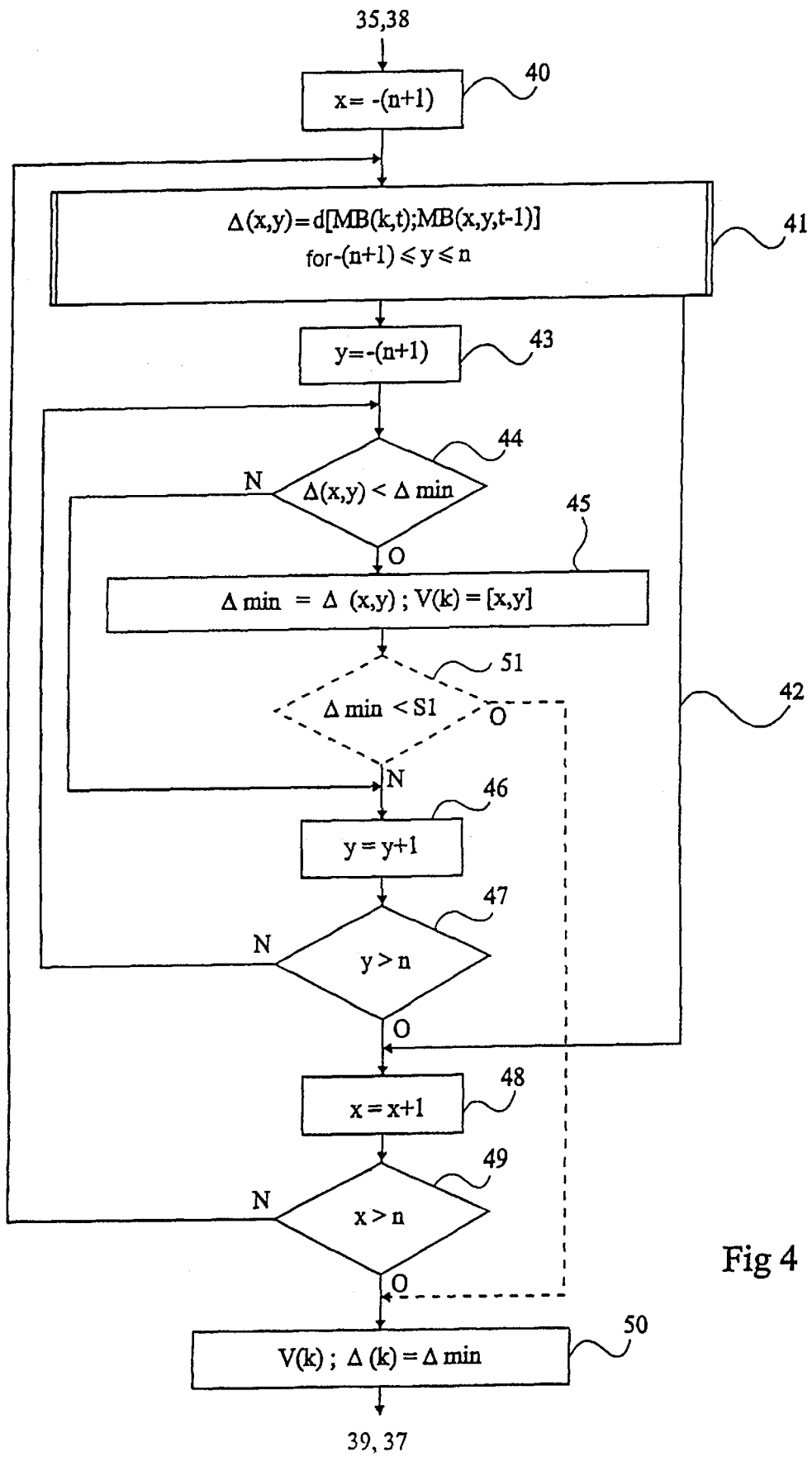
FIG. 4 illustrates, in the form of a flowchart, an embodiment of a phase of scanning of a reference window according to the present invention.
Figure 5:
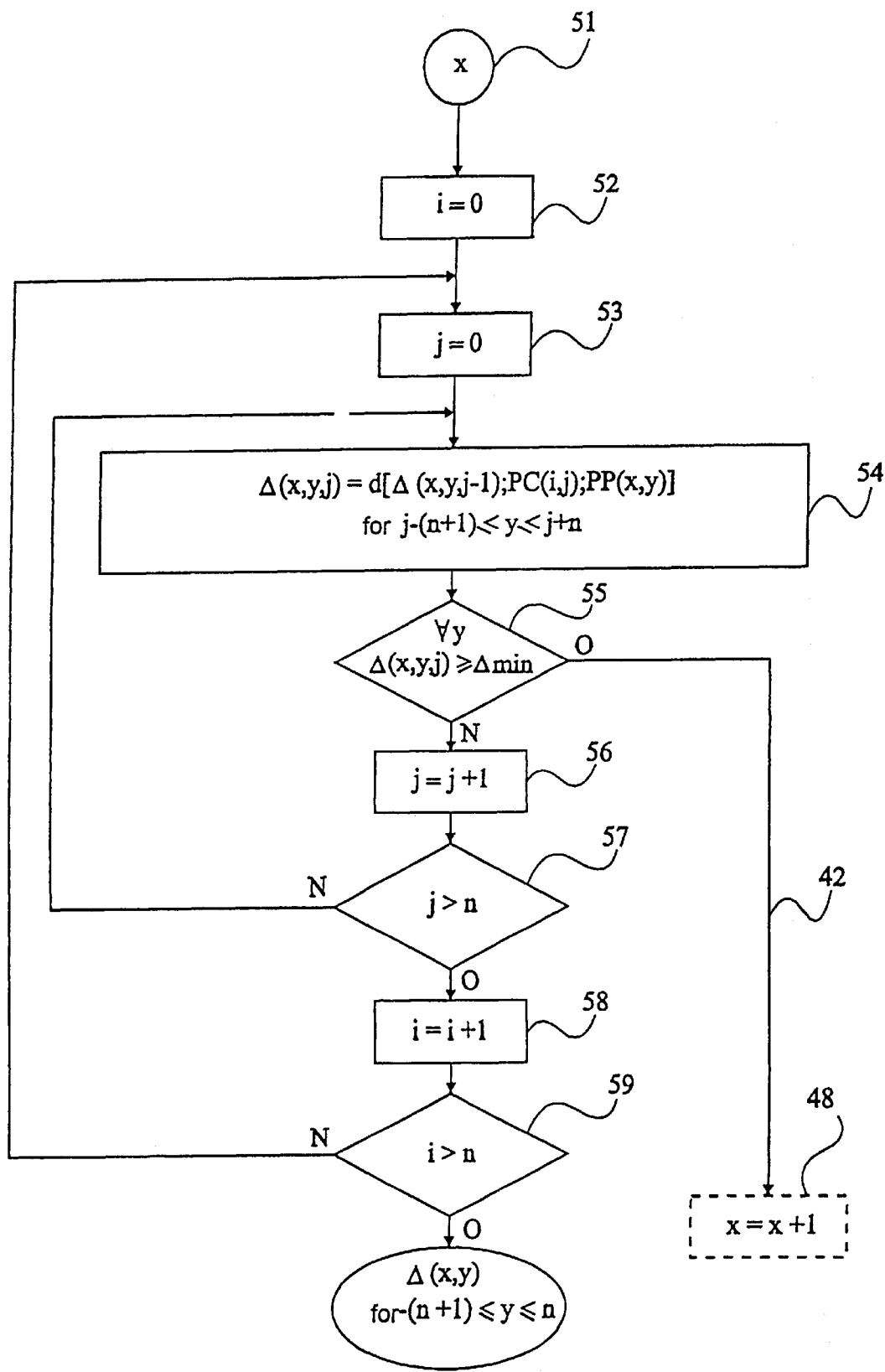
FIG. 5 shows, in the form of a flowchart, a detail of a block of FIG. 4.

FIGS. 4 and 5 illustrate the operation of the method according to the present invention during a phase of scanning of the reference window.

This operation will be described by taking as an example a horizontal scanning of vertical motion vectors processed in parallel by unit 12 starting from vector [−(n+1); −(n+1)]. It should however be noted that the present invention applies whatever the direction processed in parallel by unit 12 and whatever the order (scanning or other) in which the motion vectors are examined.

In the example shown in FIGS. 4 and 5, the horizontal position x is first set (block 40) to value −(n+1). Then (block 41), the parallel determination of the distortions Δ(x, y) for all the vertical positions of the macroblock in the reference window are determined by means of unit 12, that is, for −(n+1)⇔y⇔n.

This determination is conventional and one could refer, for example, to application Ser. No. 08/423,581, filed Apr. 19, 1995 and entitled Device For Providing Pixels To A Series Of Operators Of A Circuit For Compressing Motion Pictures, now allowed, which is incorporated herein by reference. However, a characteristic of the present invention is to enable, in some cases which will be discussed hereafter in relation with FIG. 5, to interrupt this determination to proceed to the next horizontal position (arrow 42).

If the calculation of the distortion of the entire macroblock is completed, the minimum distortion among the 2(n+1) values obtained is determined by means of unit 16. For example, a counter of vertical position y is initialized (block 43) to value −(n+1), then Δ(x, y) is compared with a minimum distortion Δmin (block 44). If Δ(x, y)<Δmin, the value Δmin stored in unit 16 is replaced with the current value of Δ(x, y) and coordinates x, y, are also stored as corresponding to vector V(k) of motion of the current vector (block 45). Otherwise, the vertical position is incremented (block 46) and operations 44, 45, and 46 are repeated as long as value n has not been exceeded (block 47). It should be noted that value Δmin must have been initialized. For this purpose, value Δmin is, preferably, initialized to the previously calculated distortion value for a null motion (block 31, FIG. 3).

Then, the counter associated with the horizontal position (block 48) is incremented and steps 41, 43, 44, 45, 46, 47, 48, are repeated as long as all horizontal positions have not been examined, that is, as long as x⇔n (block 49). Coordinates [x, y] corresponding to the motion vector V(k) for which distortion Δ(k)=Δmin are then available in unit 16 (block 50).

A characteristic of the present invention is to provide an interruption (block 51) of the macroblock processing if value Δmin modified at step 45 is lower than or equal to a predetermined threshold S1. This threshold is, for example, set to a value for which the economy in length of the message to be transmitted would be negligible if the search was continued to find a still lower distortion. An advantage of this characteristic is that it interrupts the processing as soon as a motion vector for which the distortion is acceptable has been found. However, this interruption 51 will preferably not be implemented for phases of motion estimation based on decimated macroblocks and reference windows. Indeed, in such a case, the exploited values correspond to mean values over several pixels. Thus, this step 51 will be, in the example shown in FIG. 3, implemented at step 39 and not at step 38.

The advantage of this characteristic is especially useful in an embodiment where the examination of the motion vectors is performed in an increasing order starting from a null motion vector. Indeed, in such a case, the motion determination is stopped as soon as the distortion is acceptable from the point of view of the length of the message to be transmitted and this interruption occurs for a minimum motion vector, that is, the variable-length coding of which requires a minimum message length.

Such an organization of the exploration of the reference window is, for example, performed by modifying the determination of the read addresses by transcoder 26 (FIG. 1) for the horizontal positions and by interpreting the distortion results in unit 16 from the central position of the vertical distortion vector issued by unit 12.

FIG. 5 illustrates another characteristic of the present invention implemented during the calculation of the distortions for different vertical positions with a same horizontal position. This drawing details block 41 of FIG. 4.

For each horizontal position x (block 51), a counter of horizontal positions i (block 52) and a counter of vertical positions j (block 53) of the pixels of macroblock MB(k, t) to be read from memory 4 are initialized. Then, conventionally, a calculation (block 54) of the distortion Δ(x, y, j) taking into account, for each operator of unit 12, the distortion value Δ(x, y, j−1) calculated with the preceding pixel of the current macroblock, the current pixel PC(i, j), and the pixel PC(x, y) of the reference window associated with the current vertical position j, is performed. The addressing of memories 4 and 5 in the read mode can be performed conventionally and at the end of step 54, intermediary distortion values Δ(x, y, j) for j−(n+1)⇔y⇔j+n are obtained.

Then, according to the present invention, a comparison (block 55) of these intermediary values with minimum distortion Δmin is performed. If all intermediary values are higher than or equal to Δmin, the distortion calculation for the next vertical vector, that is, for the next horizontal position x, is performed, without it being necessary to complete the calculation of the distortions for the current vertical vector.

An advantage of this characteristic of the present invention is that it enables interruption of the calculation, performed by means of unit 12 for a given horizontal position in the reference window, as soon as all the individual results of the operators are higher than a minimum distortion value previously found for another motion vector.

If there remains at least one intermediary value lower than minimum distortion Δmin, the calculation of the distortion in this horizontal position is carried on for all the vertical positions of the current macroblock in the reference window. Thus, the vertical position in the current macroblock is incremented (block 56) and steps 54, 55, and 56 are repeated until the last line of the macroblock is reached (block 57). Then, the horizontal position of the pixel read from the current macroblock is incremented (block 58) and steps 53, 54, 55, 56, 57, and 58 are repeated until the last pixel of the macroblock is processed (block 59).

If the distortion calculations have not been interrupted by block 55, then the distortions Δ(x, y) for 2(n+1) macroblocks (−(n+1)⇔y⇔n) with a same horizontal motion x are obtained.

An advantage of the present invention is that it considerably reduces, statistically, the calculation time required for the motion estimations of the macroblocks.

Another advantage of the present invention is that it applies whatever the read addressing mode used for cache memories 4 and 5.

Of course, the present invention is likely to have various alterations, modifications, and improvements which will readily occur to those skilled in the art. In particular, although reference has been made in the preceding description to a videophony standard H263, the present invention can also be implemented for other image compression standards. Further, the present invention is not limited to the processing of macroblocks of 16×16 pixels such as described as an example and applies, generally, whatever the type of operator used and whatever the parameter (here, distortion) considered for selecting a motion vector.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A method for estimation of the motion of a macroblock of pixels of a current image with respect to a reference window taken in a preceding image, comprising: determining the cumulated distortion of the pixels of the current macroblock for a null motion vector in the reference window;

choosing, as the motion vector of the current macroblock, the null vector if the distortion is lower than or equal to a first threshold;

comparing the distortion calculated for each motion vector with a minimum distortion previously calculated with respect to a macroblock of the reference window for a previously examined vector, the minimum distortion being initialized by the distortion calculated during the first step; and replacing the minimum distortion with the current distortion if the latter is lower;

wherein comparing comprises comparing, for each modification of the minimum distortion, the value of this minimum distortion with a second predetermined threshold value; and choosing, as the motion vector of the current macroblock, the vector associated with this minimum distortion.

2. A method of determining a motion vector for a macroblock, comprising:

determining a first distortion value for null motion;

comparing the first distortion value with a first threshold value; and setting the motion vector equal to the null vector if the first distortion value is less than or equal to the first threshold value determining a second distortion value between the macroblock and the mean value of the pixels in the macroblock;

comparing the second distortion value with a second threshold value; and transmitting the macroblock in intra-mode when the second distortion value is less than or equal to the second threshold value.

3. A method of determining a motion vector for a macroblock, comprising:

(a) setting a horizontal position of the macroblock;

(b) determining in parallel the distortions for all vertical positions of the macroblock in a reference window for the horizontal position;

(c) setting a vertical position of the macroblock;

(d) comparing the determined distortion for the vertical position with a minimum distortion value;

(e) setting the minimum distortion value equal to the determined distortion for the vertical position if the determined distortion for the vertical position is less than the minimum distortion value;

(f) incrementing the vertical position of the macroblock;

(g) performing (d) and (e) for each vertical position of the macroblock;

(h) incrementing the horizontal position of the macroblock; and (i) performing (b), (c), (d), (e), (f) and (g) for each horizontal position of the macroblock;

(j) comparing the determined distortions to a threshold value;

(k) interrupting (c) the setting of the vertical position of the macroblock when the determined distortions are below the threshold value; and (l) proceeding to (h) to increment the horizontal position of the macroblock.

4. A method of determining a motion vector for a segment of digital information; comprising:

obtaining an indication of the time-wise variance between the segment of digital information and a previous corresponding segment of digital information;

setting the motion vector for the segment of digital information to a predetermined value if the time-wise variance is below a threshold value;

obtaining an indication of the spatial contrast between items of digital information of the segment of digital information; and transmitting a representation of the items of digital information of the segment of digital information when the contrast is below a threshold value.

5. A device for estimation of the motion of a macroblock of a current image in a reference window containing the current macroblock and its environment in a preceding image, including:

a first cache memory for containing the current macroblock;

a second cache memory for containing the reference window;

a unit of operators, organized in systolic architecture and supplied by a reading from the cache memories, for calculating, for each position of the current macroblock in a first direction of the reference window, the distortion between the current macroblock and several macroblocks of the reference window in a second direction of the reference window;

means for determining the cumulated distortion of the pixels of the current macroblock for a null motion vector in the reference window;

means for choosing, as the motion vector of the current macroblock, the null vector if the distortion is lower than or equal to a first threshold;

means for comparing the distortion calculated for each motion vector with a minimum distortion previously calculated with respect to a macroblock of the reference window for a previously examined vector, the minimum distortion being initialized by the distortion calculated during the first step;

means for replacing the minimum distortion with the current distortion if the latter is lower means for calculating the distortion between the current macroblock and the mean value of the pixels of this macroblock; and means for interrupting the motion estimation of the current macroblock if the distortion with respect to the mean value of the pixels is lower than or equal to a third predetermined threshold.

6. A method for estimation of the motion of a macroblock of pixels of a current image with respect to a reference window taken in a preceding image, comprising:

determining the cumulated distortion of the pixels of the current macroblock for a null motion vector in the reference window;

choosing, as the motion vector of the current macroblock, the null vector if the distortion is lower than or equal to a first threshold;

comparing the distortion calculated for each motion vector with a minimum distortion previously calculated with respect to a macroblock of the reference window for a previously examined vector, the minimum distortion being initialized by the distortion calculated during the first step;

wherein comparing comprises comparing, for each modification of the minimum distortion, the value of this minimum distortion with a second predetermined threshold value;

replacing the minimum distortion with the current distortion if the latter is lower;

calculating the distortion between the current macroblock and the mean value of the pixels of this macroblock; and interrupting the motion estimation of the current macroblock if the distortion with respect to the mean value of the pixels is lower than or equal to a third predetermined threshold.

7. The method of claim 1, wherein comparing comprises:

using operators organized in systolic architecture to calculate, for each position of the current macroblock in a first direction of the reference window, the distortion between the current macroblock and several macroblocks in a second direction of the reference window; and interrupting the calculations of distortion performed for this position in the first direction if, during the calculations, the distortions become, for all positions in the second direction, higher than the minimum distortion.

8. A method for estimation of the motion of a macroblock of pixels of a current image with respect to a reference window taken in a preceding image, comprising:

determining the cumulated distortion of the pixels of the current macroblock for a null motion vector in the reference window;

choosing, as the motion vector of the current macroblock, the null vector if the distortion is lower than or equal to a first threshold;

comparing the distortion calculated for each motion vector with a minimum distortion previously calculated with respect to a macroblock of the reference window for a previously examined vector, the minimum distortion being initialized by the distortion calculated during the first step; and replacing the minimum distortion with the current distortion if the latter is lower calculating the distortion between the current macroblock and the mean value of the pixels of this macroblock; and interrupting the motion estimation of the current macroblock if the distortion with respect to the mean value of the pixels is lower than or equal to a third predetermined threshold.

9. A device for estimation of the motion of a macroblock of a current image in a reference window containing the current macroblock and its environment in a preceding image, including:

a first cache memory for containing the current macroblock;

a second cache memory for containing the reference window;

a unit of operators, organized in systolic architecture and supplied by a reading from the cache memories, for calculating, for each position of the current macroblock in a first direction of the reference window, the distortion between the current macroblock and several macroblocks of the reference window in a second direction of the reference window;

means for choosing, as the motion vector of the current macroblock, the null vector if the distortion is lower than or equal to a first threshold;

means for comparing the distortion calculated for each motion vector with a minimum distortion previously calculated with respect to a macroblock of the reference window for a previously examined vector, the minimum distortion being initialized by the distortion calculated during the first step; and means for replacing the minimum distortion with the current distortion if the latter is lower;

wherein the means for comparing comprises means for comparing, for each modification of the minimum distortion, the value of this minimum distortion with a second predetermined threshold value; and means for choosing, as the motion vector of the current macroblock, the vector associated with this minimum distortion.

10. The method of claim 2, further comprising:

comparing the second distortion value with a second threshold value; and determining the motion vector for the macroblock if the second distortion value is not less than or equal to the second threshold value.

11. The method of claim 2, wherein determining the first and second distortion values is done in parallel.

12. The method of claim 2, wherein the macroblock is decimated.

13. The method of claim 2, wherein the macroblock is undecimated.

14. The method of claim 3, further comprising:

comparing the determined distortion value to a threshold value;

interrupting (c) the setting of the vertical position of the macroblock when the determined distortion value is below the threshold value; and proceeding to (h) to increment the horizontal position of the macroblock.

15. The method of claim 4, wherein the transmitting of items of digital information comprises compressing the items of digital information using a compression algorithm.

16. The method of claim 4, wherein obtaining the indication of the time-wise variance is performed in parallel without obtaining an indication of the spatial contrast between the items of digital information.

17. The method of claim 4, further comprising:

determining the motion vector for the segment of digital information if the time-wise variance is above the threshold value.

18. The method of claim 4 wherein the segment of digital information is a macroblock; and wherein the items of digital information are pixels in the macroblock.

19. The device of claim 9, wherein the means for comparing comprises:

means for using operators organized in systolic architecture to calculate, for each position of the current macroblock in a first direction of the reference window, the distortion between the current macroblock and several macroblocks in a second direction of the reference window; and means for interrupting the calculations of distortion performed for this position in the first direction if, during the calculations, the distortion becomes, for all positions in the second direction, higher than the minimum distortion.

* * * * *